(12) United States Patent
Visotsky et al.

(10) Patent No.: US 9,877,321 B2
(45) Date of Patent: Jan. 23, 2018

(54) SLOT ALLOCATION IN TIME DIVISION DUPLEX SYSTEMS

(71) Applicant: NOKIA SOLUTIONS AND NETWORKS OY, Espoo (FI)

(72) Inventors: Eugene Visotsky, Buffalo Grove, IL (US); Mark Cudak, Rolling Meadows, IL (US); Frederick Vook, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 84 days.

(21) Appl. No.: 14/757,472

(22) Filed: Dec. 23, 2015

(65) Prior Publication Data

US 2017/0188357 A1 Jun. 29, 2017

(51) Int. Cl.
*H04J 3/00* (2006.01)
*H04W 72/04* (2009.01)
*H04L 5/14* (2006.01)
*H04W 56/00* (2009.01)

(52) U.S. Cl.
CPC ....... *H04W 72/0446* (2013.01); *H04L 5/1469* (2013.01); *H04W 56/001* (2013.01)

(58) Field of Classification Search
None
See application file for complete search history.

(56) References Cited

U.S. PATENT DOCUMENTS

| 7,639,708 B1* | 12/2009 | Snodgrass | H04W 72/0446 370/431 |
| 2009/0135748 A1* | 5/2009 | Lindoff | H04W 72/048 370/296 |
| 2010/0303004 A1* | 12/2010 | Mueck | H04L 1/0625 370/328 |
| 2012/0281569 A1* | 11/2012 | Yamamoto | H04L 1/1893 370/252 |
| 2014/0171093 A1* | 6/2014 | Stanwood | H04W 72/10 455/450 |
| 2014/0197976 A1* | 7/2014 | Pelley | H03M 5/02 341/182 |

* cited by examiner

*Primary Examiner* — Phirin Sam
(74) *Attorney, Agent, or Firm* — Squire Patton Boggs (US) LLP

(57) ABSTRACT

Various communication systems may benefit from managing signal interference. For example, certain wireless communication systems may benefit from a dynamic time division duplex system involving slot allocation. A method includes allocating, by an access point, in a time division duplex frame a plurality of radio resource slots, each one of the plurality of radio resource slots being allocated for a downlink or an uplink transmission, and determining that the allocation of the downlink or uplink transmission should be changed. The method also includes applying a permutation pattern to re-allocate at least one of the plurality of radio resource slots for the downlink or uplink transmission.

20 Claims, 7 Drawing Sheets

Figure 1

"High-Interference" UL TTIs

| UL/DL configuration | Switching point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

SLOT ALLOCATION IN TIME DIVISION DUPLEX SYSTEMS

BACKGROUND

Field

Various communication systems may benefit from managing signal interference. For example, certain wireless communication systems may benefit from a dynamic time division duplex system involving slot allocation.

Description of the Related Art

Time division duplex (TDD) refers to duplex communication links in which different time slots, also known as subframes, in the same frequency band are dedicated to either uplink (UL) or downlink (DL) transmissions. In some embodiments, special subframes may also be included in the TDD frame. TDD allow for the asymmetric flow of uplink and downlink data transmissions. As the amount of uplink data in the network increases, more time slots in the radio frame can be dedicated to uplink transmission. On the other hand as the downlink traffic load becomes lighter, the amount of slots allocated to downlink transmission may increase.

Dynamic time division duplex (DTDD) systems are superior at adapting DL/UL radio resources slots to the time and spatially-varying short-term traffic demand observed in the network. This increased flexibility in resource assignment, however, can lead to a significant increase in interference. Inference can be directly caused by a power imbalance between the DL and UL transmission powers. Interference can be especially pronounced during UL transmission slots if a neighboring network node is undergoing a DL transmission.

FIG. 1 illustrates a radio frame allocation. In this diagram, interference between a first access point (AP1) 110 and a second access point (AP2) 120 is illustrated. AP1 110 can be allocated with a higher number of DL slots than AP2, which causes interference in certain UL slots of AP2.

FIG. 2 illustrates current network architecture under the 3rd Generation Partnership Project (3GPP). As can be seen in FIG. 2, current long term evolution (LTE) systems support dynamic TDD operation, but support only a fixed number of DL/UL slot patterns. FIG. 2 only lists seven possible UL/DL configurations. This is mainly due to the requirement to support legacy TDE-LTE devices. The supported DL/UL slot patterns within the radio frame in the current network architecture are therefore limited and heavily constrained.

SUMMARY

A method, in certain embodiments, may include allocating, by an access point, in a time division duplex frame a plurality of radio resource slots, each one of the plurality of radio resource slots being allocated for a downlink or an uplink transmission, and determining that the allocation of the downlink or uplink transmission should be changed. The method may also include applying a permutation pattern to re-allocate at least one of the plurality of radio resource slots for the downlink or uplink transmission.

According to certain embodiments, an apparatus may include at least one memory including computer program code, and at least one processor. The at least one memory and the computer program code may be configured, with the at least one processor, to cause the apparatus at least to allocate, by an access point, in a time division duplex frame a plurality of radio resource slots, each one of the plurality of radio resource slots being allocated for a downlink or an uplink transmission, and determine that the allocation of the downlink or uplink transmission in the should be changed. The at least one memory and the computer program code may also be configured, with the at least one processor, to cause the apparatus at least to apply a permutation pattern to re-allocate at least one of the plurality of radio resources slots for the downlink or the uplink transmission.

An apparatus, in certain embodiments, may include means for allocating, by an access point, in a time division duplex frame a plurality of radio resource slots, each one of the plurality of radio resource slots being allocated for a downlink or an uplink transmission, and means for determining that the allocation of the downlink or uplink transmission should be changed. The apparatus may also include means for applying a permutation pattern to re-allocate at least one of the plurality of radio resources slots for the downlink or the uplink transmission.

According to certain embodiments, a non-transitory computer-readable medium encoding instructions that, when executed in hardware, perform a process. The process may include allocating, by an access point, in a time division duplex frame a plurality of radio resource slots, each one of the plurality of radio resource slots being allocated for a downlink or an uplink transmission, and determining that the allocation of the downlink or uplink transmission should be changed. The process may also include applying a permutation pattern to re-allocate at least one of the plurality of radio resources slots for the downlink or the uplink transmission.

BRIEF DESCRIPTION OF THE DRAWINGS

For proper understanding of the invention, reference should be made to the accompanying drawings, wherein:

FIG. 1 illustrates a radio frame allocation.

FIG. 2 illustrates 3GPP-TDD architecture.

DETAILED DESCRIPTION

Figure 3:
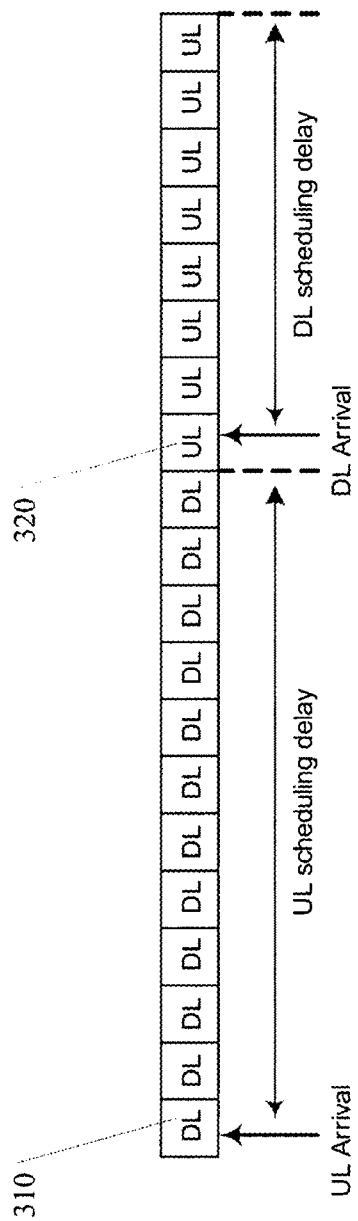
FIG. 3 illustrates a frame allocation according to certain embodiments.

Certain embodiments provide for a distributed DL/UL slot allocation scheme that can simultaneously mitigate DTDD interference and achieve a low-latency slot configuration in $5^{th}$ generation mobile networks (5G). Due to higher data rates associated with 5G, the bursty nature of data traffic may be exacerbated.

In this 5G environment, the communications system may rapidly transition from periods of high load to periods of low load. In some embodiments, when an access point (AP) and its neighboring access points are heavily loaded, the APs may need to align their TDD split to maximize capacity. When the AP, along with its neighboring access points, are lightly loaded, the access point may adjust its local TDD split depending on how much data it or the user equipment (UE) associated with a given AP has in the DL and UL.

In certain embodiments, a distributed method may be used to allocate a pattern of DL/UL slots in APs within the network to provide for low-interference and low-latency operation of the network. Other embodiments provide for a distributed algorithm for coordinating DL/UL slot assignments across sectors and/or sites in a future 5G wireless system. In these embodiments, the number of DL/UL slots in a radio frame is allowed to change dynamically and non-uniformly across the network.

In addition, all APs, in certain embodiments, may follow the steps of the algorithm of the allocation pattern, resulting in consistent DL/UL slot patterns across the network. Neighboring APs may employ a low latency dynamic TDD air-interface to share the permutation algorithm with each other. This can help minimize the DL-into-UL and UL-into-DL slot collisions across the network.

In certain embodiments, the communications system is assumed to be slot-synchronous, meaning that the slot boundaries align across the entire network. Further, the DL/UL slot assignments can be performed periodically and also with radio frames in which the slot assignments are aligned across the entire network. In one embodiment, the APs may negotiate to achieve the slot synchronization.

As discussed above, certain embodiments involve a distributed DL/UL slot allocation scheme. Each AP can use a specific algorithm to make a decision on how to go about allocating a radio frame with a particular pattern of slots. The AP can also receive a feedback signal from at least one neighboring access point. This feedback signal can then be taken into consideration by the AP when allocating radio resource slots. When making allocation decisions, the AP may take into account various factors and criteria that can be used to guide its decision making.

One such criterion that can be considered by the AP is low overhead. APs may determine the pattern autonomously, without requiring any information exchange over the backhaul. Another such criterion is low interference operation. In considering this factor, the AP takes into account the number of DL slots overlapping with UL slots at adjacent APs. To account for adjacent APs, in certain embodiments the APs may share information regarding the applied DL/UL splits. Because arrangements having overlapping DL and UL slots lead to interference, the AP may attempt to minimize the number of overlapping slots. Another criterion is low latency operation. In taking this criterion into consideration, the AP may favor a slot allocation pattern that does not result in an excessive packet delay at the AP.

FIG. 3 shows a frame according to certain embodiments. The frame in FIG. 3 is one example of how an AP may assign a DL/UL slot that fulfill the first two criteria, low overhead and low interference operation. In this embodiment, APs follow a simple rule of assigning DL slots toward the front end of the radio frame, while assigning UL slots toward the back end of the radio frame. This frame pattern can be applied autonomously at each AP, and can act to minimize the overlap between DL and UL slots.

The frame pattern of FIG. 3, however, may not meet the low latency criterion. Because the DL and UL slot allocations are contiguous, a UL packet that arrives in the beginning of the consecutive DL slots, or a DL packet that arrives at the beginning of the consecutive UL slots, would incur a long delay before encountering its first scheduling opportunity. For example, in FIG. 3 if a UL packet arrives in the first DL slot 310, the UL packet will have to wait for twelve time slots until a UL transmission is scheduled. Similarly, if a DL packet arrives at the first time slot allocated for uplink transmission 320, the DL packet will have to wait for eight time slots until a DL transmission is scheduled.

Certain embodiments aim to minimize or even prevent this scheduling latency, as well as attempt to meet the other two criteria described above. In some embodiments, this can be achieved by avoiding TDD patterns with a high number of consecutive DL and UL slots. A permutation pattern may be used to re-allocate the consecutive slots more evenly. In certain embodiments, the TDD frame length may be common to all or some access points in the network. In such embodiments, the TDD frame may be time synchronized across the access points.

Figure 4:
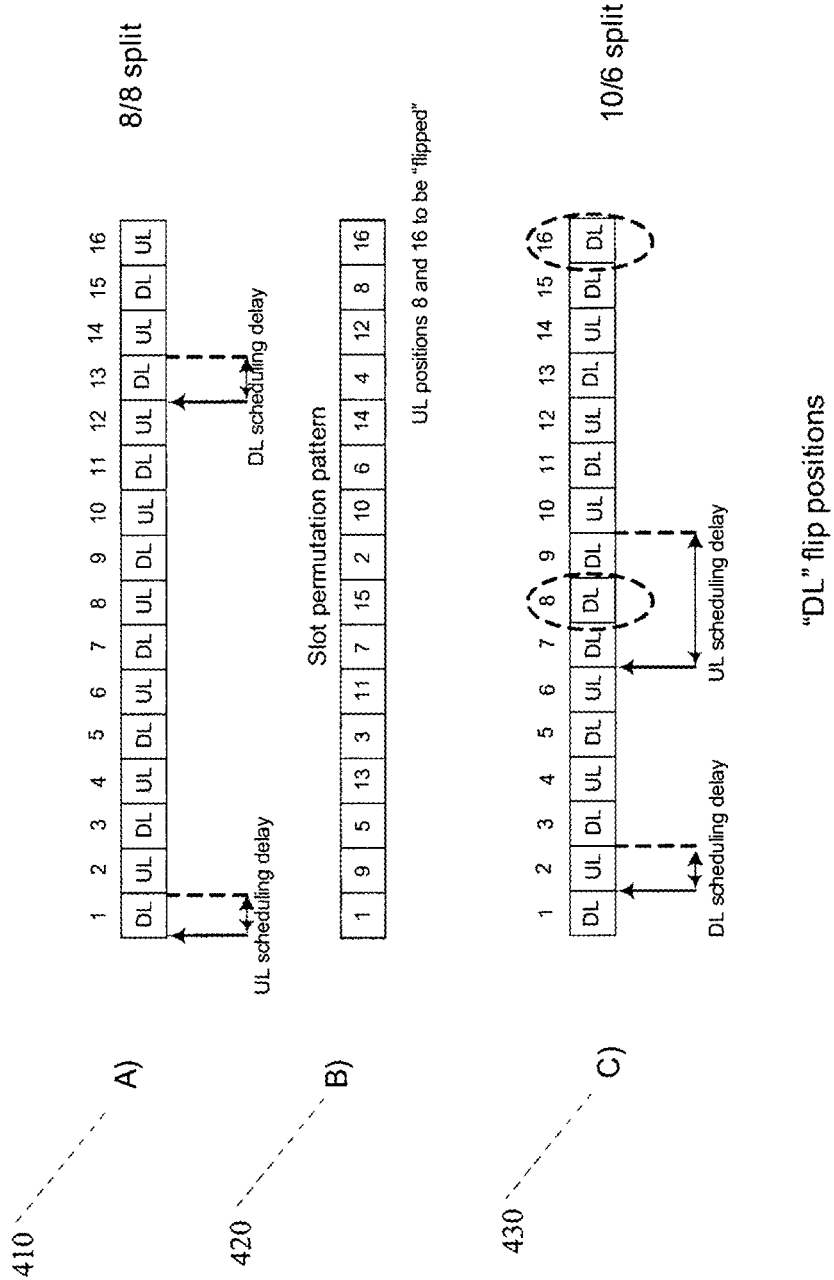
FIG. 4 illustrates a frame allocation according to certain embodiments.

FIG. 4 illustrates a frame allocation according to certain embodiments. First, the AP allocates in a TDD frame a plurality of radio resource slots for DL/UL transmission. This initial TDD split may be based at least in part on feedback from a neighboring access points. For example, neighboring access points could exchange DL/UL load information and converge on a common split. In another embodiment, each AP may determine its split autonomously by taking into account DL/UL load information from the neighboring APs. In this embodiment, one access point having DL data only may not use full DL slots if the neighboring access points also have UL data pending. The TDD frame of FIG. 4 contains 16 time slots. As can be seen in Frame A 410 of FIG. 4, the TDD pattern is based on the DL-UL repetition pattern. In this embodiment, there is a fifty-fifty split in DL to UL transmission slots, in which each slot alternates between UL and DL. In a 16 slot frame, this will achieve an 8 to 8 split between the UL and the DL allocated slots. Because the DL and UL transmission slots alternate after each time slot, the pattern will have the lowest possible scheduling delay. The maximum scheduling delay in this pattern may be one time slot.

In other embodiments, the TDD pattern of Frame A 410 may be a DL-DL-UL repetitive pattern for scenarios with heavy DL traffic distribution. In certain embodiments, the initial allocation may be an initial slot repetition pattern based on a pre-specified kernel. For example, the kernel may specify a repeating DL-UL pattern or a DL-DL-UL pattern. In another example, the kernel may be pre-specified to the AP or signaled to the AP from a neighboring AP, or any other network entity. Once the AP evaluated the initial allocation of the TDD frame, it can determine whether the allocation of the DL/UL transmission in the plurality of radio resource slots should be changed. Reallocating radio resource slots may be caused by unbalanced DL/UL traffic load/distribution, or by negotiation with adjacent access points in order to avoid interference. In embodiments in which adjacent access points use the same DL/UL split, inter-cell interference may be reduced.

In some embodiments, while the plurality of radio resource slots may be allocated to DL or UL, there may be some special slots which are not allocated to either DL or UL. In such embodiments, some or all of the special slots may not be changed or flipped.

Frame B 420 of FIG. 4 illustrates a slot permutation pattern. To arrive at a frame having an alternate DL/UL split pattern, a pseudo-random slot permutation pattern may be used. In frame B of FIG. 4, all originally consecutive slots are separated by at least three slot positions in the pattern. For example, frame B has seven slots between original slot 1 and slot 2, three slots between original slots 2 and 3, and seven slots between original slots 3 and 4.

To achieve this pseudo-random slot permutation pattern, a low complexity recursive procedure to construct the permutation pattern may be used. The recursive procedure can be applicable to any radio frame having a length represented by $2^k$, in which k can be any positive integer. The length n of permutation pattern sequence $P_n$, for example, may therefore be two, four, eight, sixteen, thirty two, etc. The permutation pattern may also be a deterministic algorithm which provides for low-latency slot re-allocation.

In certain embodiments, determining $P_n$ includes an initial step of defining the first two permutation sequences as $P_2=\{0, 1\}$, $P_4=\{0, 2, 1, 3\}$. Next, a recursive step having a permutation algorithm is undertaken. In this recursive step, the length n of permutation sequence $P_n$ can be defined as $n=2^k$. Length n [0, 1, . . . , n–1] may then be split into consecutive groups of 4, such that jth group contains number [(j–1)*4 . . . j*4–1]. The jth group [(j–1)*4 . . . j*4–1] will map into positions [0 2 1 3]*n/4+$P_{n/4}$(j), where j=1, 2, . . . n/4. In some embodiments, sequence $P_{n/4}$ was already constructed in the previous initial step. The steps may be numbered as log 2(n). For example, n=8 in the third step, while n=16 in the fourth step. Sequence $P_{n/4}$, which is used in step n, may be constructed recursively in step n–2.

In some embodiments, the only input to the above permutation algorithm is the number of slots in a frame. This number of slots may either be signaled to the APs, or may be pre-specified.

Figure 5:
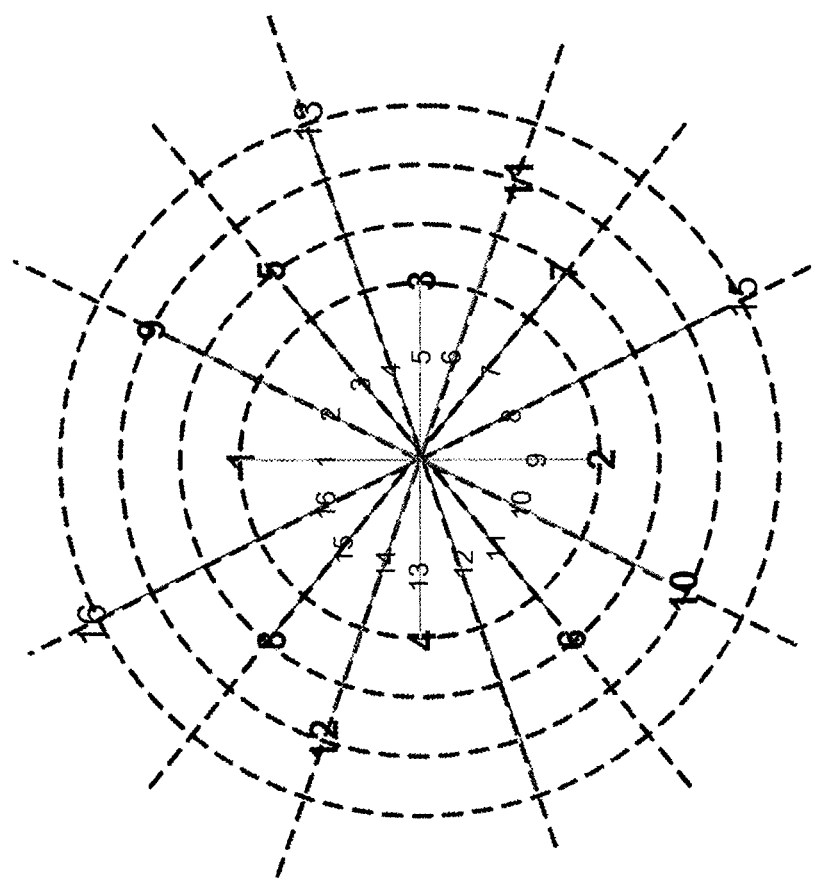
FIG. 5 illustrates a sequence construction according to certain embodiments.

FIG. 5 illustrates a sequence construction according to certain embodiments. The sequence may be calculated according to the low complexity recursive procedure used to generate the permutation pattern. The inner most circle in FIG. 5, having numbers 1 through 16 listed therein, is indicative of length n. The linear lines intersecting the inner most circle indicate the slot numbers assigned to consecutive permuted slot positions. For example, slots 1 and 9, and slots 5 and 13 will be consecutive numbered slots in the permutation pattern.

FIG. 5 also illustrates the permuted slot positions, listed in the inner most circle, relative to the initial slot positions, listed in the outer circles. For example, original slot 1 will remain permuted slot 1, while original slot 9 will be re-allocated to permuted spot 2. In another example, original slot 3 will be re-allocated to permuted spot 5, while original spot 4 will be re-allocated to permuted spot 13. The particular position of the slot within the frame can be referred to as a slot index.

In FIG. 4, the number of DL slots required $N_{DL\_required}$, in certain embodiments, may be higher than the number of required UL slots $N_{UL\_required}$. That is, $N_{DL\_required} > N_{UL\_required}$. In addition, if all the slots in the frame are allocated, the frame length $N_F$ can be calculated by adding $N_{DL}$ and $N_{UL}$. In certain embodiments, the only input to the algorithm is $N_F$, which could be either signaled to the APs or pre-specified. Starting with the "DL-UL" repetition pattern, as shown in Frame A 410 of FIG. 4, the number of additional DL slots needed can be calculated with the following equation:

$$N_{add\_dl} = N_{DL\_required} - \frac{N_F}{2}.$$

According to the example of FIG. 4, $N_{DL\_required}=10$, $N_F=16$, and $N_{add}=2$.

The AP, in certain embodiments, determines the number of required DL slots and required UL slots according to its own DL/UL traffic distribution. In some embodiments, the AP may determine $N_{DL\_required}$ and $N_{UL\_required}$ based on the following equation:

$$\rho_{DL\_split} = \sum_{j \in C} B_{DL,j} \Big/ \left( \sum_{j \in C} B_{DL,j} + \sum_{j \in C} B_{UL,j} \right).$$

$B_{DL,j}$ may be the downlink buffer status for UEs attached to access point j, $B_{UL,j}$ may be the uplink buffer status for UEs attached to access point j, and C may be the set of access points over which the dynamic TDD split is being coordinated. The metric to determine DL/UL split allocation may be based on the UE file transfer protocol buffer sizes. In other embodiments, the AP determines the number of required DL slots and required UL slots depending on the traffic distribution of its neighbor APs or associated UEs. The number of the plurality of radio resource slots of the TDD frame that needs to be changed from the downlink transmission to the uplink transmission, or vice versa, may be determined. A predefined rule may then applied on the permutation pattern of the TDD frame to flip the allocation of the number of radio resource slots depending on the determination.

Next, in certain embodiments, a permutation pattern as shown in Frame B of FIG. 4 is used. As explained, this permutation pattern 420 may be obtained with the procedure explained in connection with FIG. 5. The permutation pattern can be applied to re-allocate the plurality of radio resource slots for the DL or UL transmission. Starting with even permutation positions, and moving right to left in the permutation pattern, as shown in frame B of FIG. 4, $N_{add\_dl}$ UL slots will be flipped into DL slots. For example, if $N_{add\_dl}=2$, UL slots 8 and 16, the first two even permutation positions on the right of the permutation pattern of Frame B 420, will be flipped into DL slots. In certain embodiments, only these two slots will be re-allocated, while the remaining slots will have the same allocation and the same position as indicated in initial Frame A 410. In some embodiments, therefore, the allocation of plurality of radio resource slots is flipped according to the permutation pattern.

The resulting DL/UL slot pattern is shown in Frame C 430 of FIG. 4. As can be seen in Frame C 430, the split between the DL/UL allocated slots is now a ten to six split. Two of the UL allocated slots in Frame A 410, slots 8 and 16, were flipped into DL slots, according to the above described embodiments. The allocation and position of the remaining slots in FIG. 4, slots 1-7 and 9-15, can be unaffected, and remain the same as in Frame A 410. In other embodiments, other rules for flipping UL slots to DL slots are possible as long as the rule can be consistently applied across the APs in the network via a predefined or pre-specified rule. The rule may be pre-specified in the APs or it may be shared among neighboring APs.

In certain embodiments, the number of required UL slots $N_{UL\_required}$, may be higher than the number of required DL slots $N_{DL\_required}$. That is, $N_{UL\_required} > N_{DL\_required}$. The number of additional UL slots needed can be calculated with the following equation:

$$N_{add\_ul} = N_{UL\_required} - \frac{N_F}{2}.$$

In this embodiment, the DL slots to be flipped are determined from odd slots in the permutation pattern going left to right. For example, if two additional UL slots are needed, slots 1 and 9, in Frame B 420 of FIG. 4, will be flipped to UL slots, to result in a ten to six split in the frame between UL and DL slots.

Figure 6:
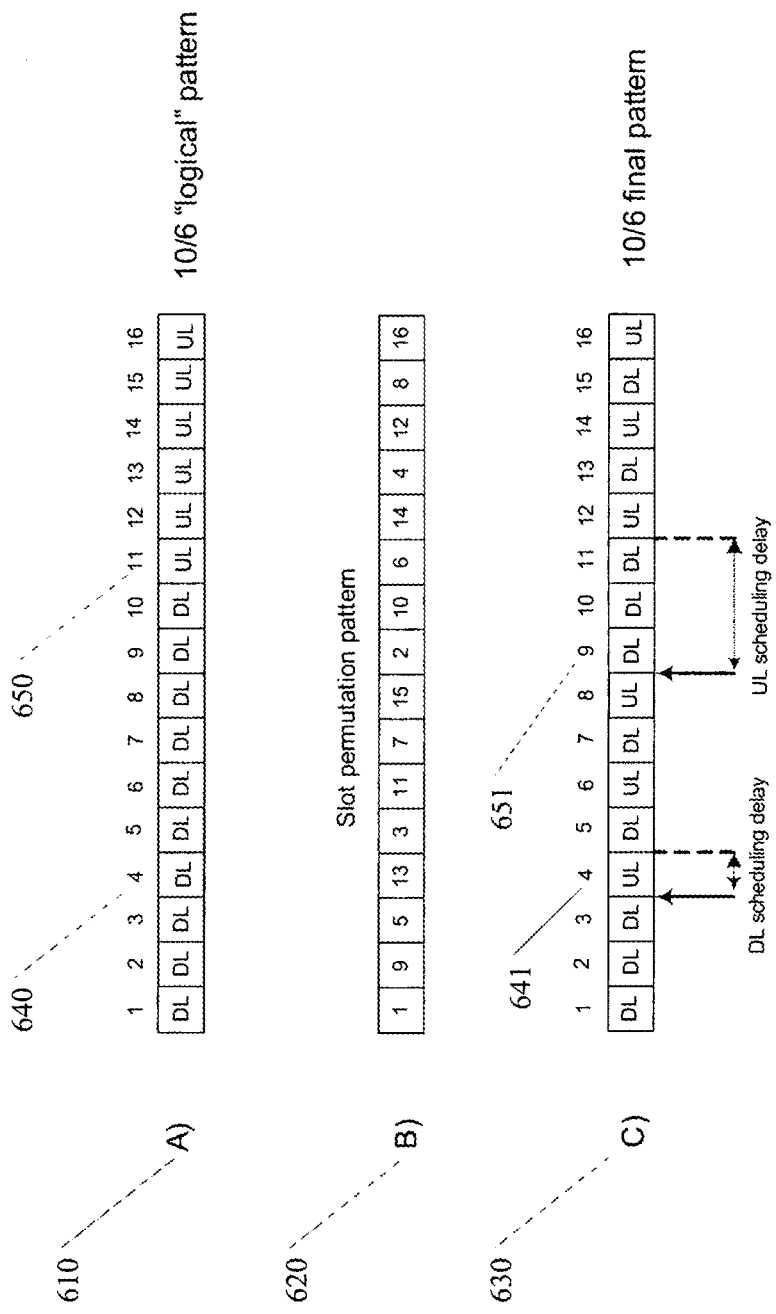
FIG. 6 illustrates a frame allocation according to certain embodiments.

FIG. 6 illustrates a frame allocation according to certain embodiments. First, Frame A 610 has a logical or initial slot pattern of consecutive DL/UL slots, corresponding to the desired TDD split. The TDD split may be determined based on feedback from a neighboring access point and/or based on DL/UL traffic load. As opposed to the DL-UL repetition pattern in Frame A 410 of FIG. 4, Frame A 610 shows ten consecutive DL slots, followed by six consecutive UL slots. While this pattern in Frame A 610 allows for low overheard and low interference, this frame is not optimal for in terms of the latency criterion. A permutation pattern for the sequence of slots is provided in Frame B 620 of FIG. 6. This permutation pattern may be calculated according to the low complexity recursive procedure with use of the permutation algorithm discussed above in connection with FIG. 5. This permutation pattern is then applied to Frame A 610, and the slots are re-allocated.

Frame C 630 illustrates the final pattern of the radio resource slots after the permutation pattern has been applied. As can be seen in FIG. 6, Frame C 630 is wholly dependent on the permutation pattern of Frame B 620. In this embodiment, unlike the embodiment shown in FIG. 4, the permutation pattern may be used in its entirety, as opposed to partially using it for flipping a plurality of radio resource slots. As can be seen in Frame C 630, the permutation pattern applied to the radio frame decreases the latency of the UL and DL transmissions. In other words, the radio resource slots in the TDD frame are re-allocated according to the permutation pattern, wherein the indexes in the permutation pattern indicate the re-allocated order of the plurality of radio resource slots in the TDD frame.

For example, in Frame A 610, if a UL packet arrives in the fourth slot in the frame 640, the UL packet will have to wait for six time slots until a UL transmission is scheduled. Similarly, if a DL packet arrives at the first time slot allocated for uplink transmission 650 in frame A, the DL packet will have to wait six time slots until a DL transmission is scheduled. After the permutation pattern is applied to Frame A 610, however, resulting in Frame C 630, a DL packet arriving in the fourth slot 641 in the frame will only have to wait one time slot until a downlink transmission is scheduled. An UL, on the other hand, arriving in the ninth slot 651 in the frame will only have to wait three time slots before an uplink transmission is scheduled.

Figure 7:
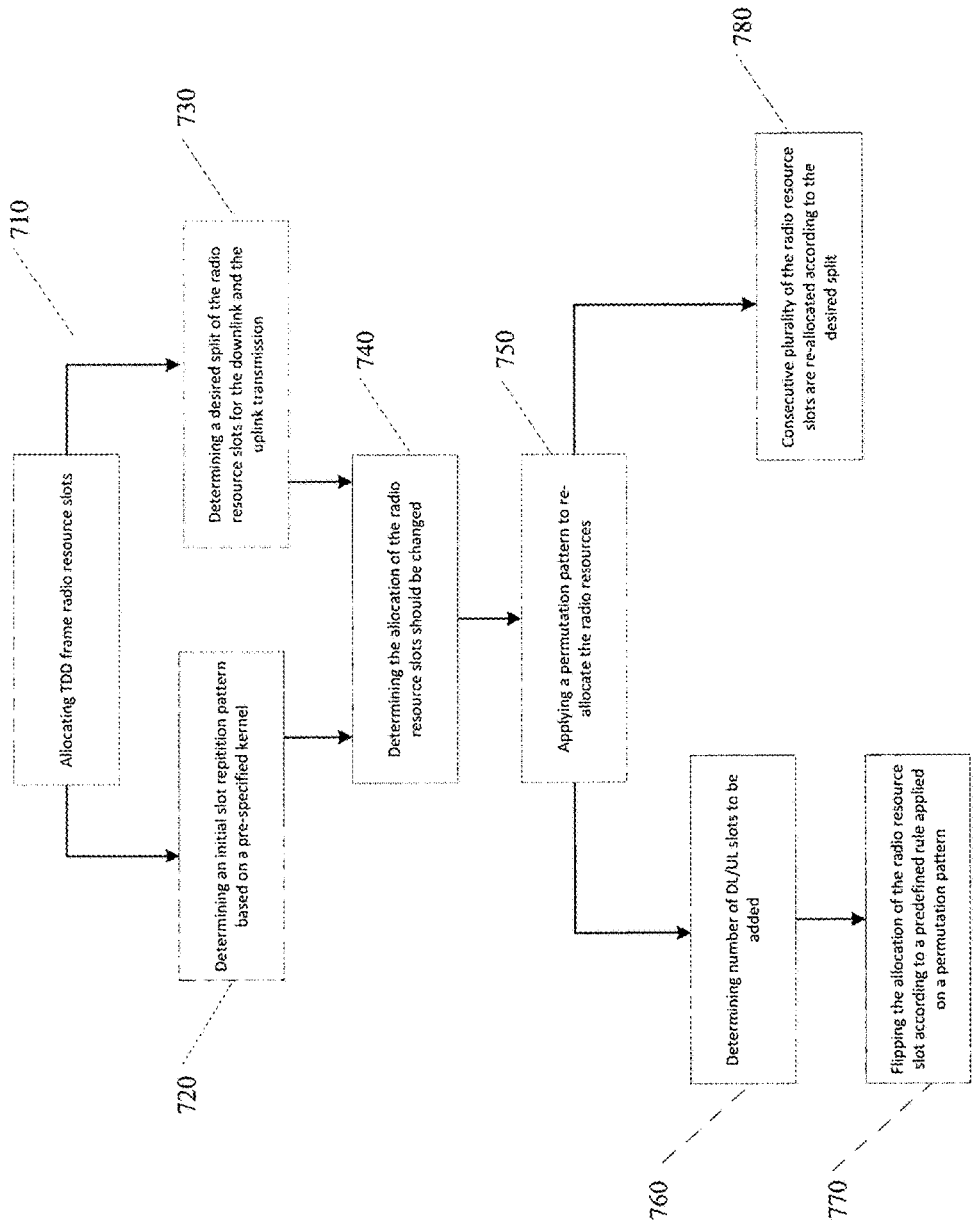
FIG. 7 illustrates a flow diagram according to certain embodiments.

FIG. 7 illustrates a flow diagram according to certain embodiments. The flow diagram embodied in FIG. 7 provides for a distributed DL/UL slot allocation scheme that simultaneously mitigates DTTD interference and achieves a low-latency slot configuration required for 5G. In step 710, an access point can allocate in a TDD frame a plurality of radio resource slots for a DL/UL transmission. In certain embodiments, the initial allocation may be an initial slot repetition pattern based on a pre-specified kernel, as indicated in step 720. For example, the kernel may specify a repeating DL-UL pattern. In another example, the kernel may specify a pattern for scenarios with heavy DL traffic distribution, for example, DL-DL-UL. In other embodiments, any division of DL and UL slots is possible. The kernel may be either pre-specified or signaled to the AP from another network entity. In other embodiments, as indicated in step 730, the initial allocation may be a logical DL/UL slot based on the desired TDD split. In other words, step 730 may involve determining a desired split of the radio resource slots for the downlink and the uplink transmission The TDD split may also be determined based on feedback from a neighboring access point.

In step 740, the access point can determine that the allocation of the downlink or uplink transmission in the plurality of radio resource slots should be changed. In some other embodiments, involving central dynamic TDD implementations, a central controller may be response for TDD slot allocation. In step 750, the access node may apply a permutation pattern to re-allocate the plurality of radio resource slots for the DL/UL transmission. In some embodiments, it is assumed that all APs in the network follow the low-complexity recursive method for constructing the slot permutations patterns, as described above in FIG. 5. In other words, in some embodiments, the permutation of the predetermined pattern may be known to all the APs. This results in consistent DL/UL slot patterns across the network that minimize DL-into-UL and UL-into-DL slot collisions.

While the permutation pattern to re-allocate radio resources can be used in many embodiments of the invention, certain embodiments utilize the permutation pattern in different ways. For example, in certain embodiment, as in step 760, an algorithm is used to determine the number of DL or UL slots to be added $N_{add}$ in order to obtain the desired TDD split. Once this number is determined, in step 770, flipping of the allocation of the plurality of radio resource slots may occur in accordance with the determination of $N_{add}$ and the slot permutation pattern, as seen in FIG. 4. In certain embodiments flipping the allocation is based on the number of the plurality of radio resource slots according to a predefined rule applied on the permutation pattern.

In step 780, on the other hand, a consecutive plurality of the radio resource slots are re-allocated according to the desired split. In other words, the positions of the DL and UL slots are re-allocated according to the slot permutation pattern, as seen in FIG. 6.

Figure 8:
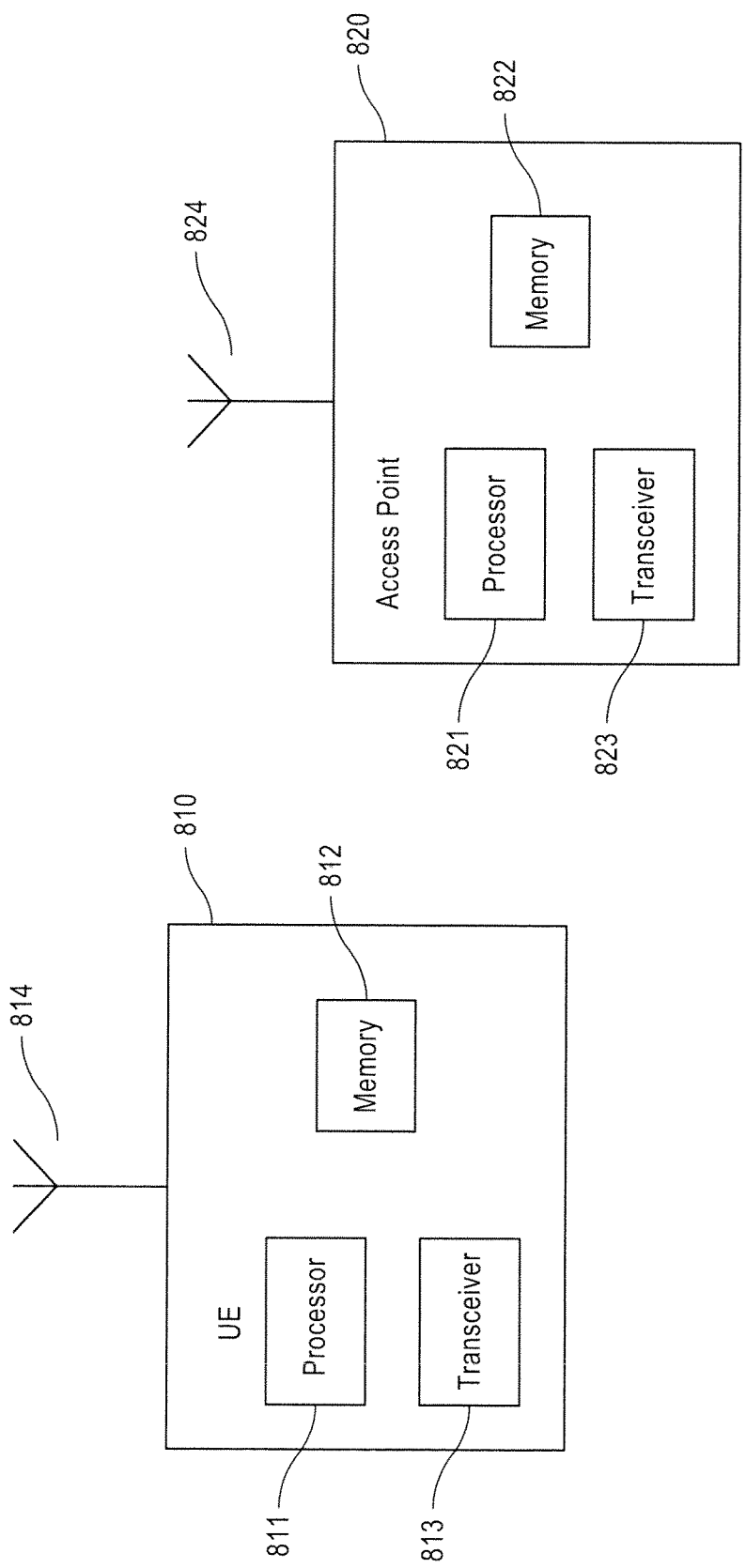
FIG. 8 illustrates a system according to certain embodiments.

FIG. 8 illustrates a system according to certain embodiments. It should be understood that each block of the flowchart of FIG. 7, and the allocation and re-allocation involved in FIGS. 4 and 6, or any combination thereof, may be implemented by various means or their combinations, such as hardware, software, firmware, one or more processors and/or circuitry. In one embodiment, a system may include several devices, such as, for example, access point 820 or UE or user device 810. The system may include more than one UE 810 and more than one access point 820, although only one access node shown for the purposes of illustration. An access point can be a network node, a base station, an eNB, server, host or any of the other access or network node discussed herein.

In one embodiment at least some of the functionalities of the apparatus 820 may be shared between two physically separate devices forming one operational entity. Therefore, the apparatus may be the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station. In certain embodiments, at least some of the described processes may be performed by the RCU. In other embodiments, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, such as a virtual network. Network virtualization may involve platform virtualization, often combined with resource virtualization. Network virtualization may be categorized as external virtual networking which combines many networks, or parts of networks, into the server computer or the host computer (such as the RCU). External network virtualization may be targeted to optimized network sharing. Another category can be internal virtual networking which provides net-work-like functionality to the software containers on a single system. Virtual networking may also be used for testing the terminal device.

In yet another embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Each of these devices may include at least one processor or control unit or module, respectively indicated as 811 and 821. At least one memory may be provided in each device, and indicated as 812 and 822, respectively. The memory may include computer program instructions or computer code contained therein. One or more transceiver 813 and 823 may be provided, and each device may also include an antenna, respectively illustrated as 814 and 824. Although only one antenna each is shown, many antennas and multiple antenna elements may be provided to each of the devices. Other configurations of these devices, for example, may be provided. For example, Access point 820 and UE 810 may be additionally configured for wired communication, in addition to wireless communication, and in such a case antennas 814 and 824 may illustrate any form of communication hardware, without being limited to merely an antenna.

Transceivers 813 and 823 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 810 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiment, an apparatus, such as an access node, may include means for carrying out embodiments described above in relation to FIGS. 3, 4, 6, and 7. In certain embodiments, at least one memory including computer program code can be configured to, with the at least one processor, cause the apparatus at least to perform any of the processes described herein.

According to certain embodiments, an apparatus 820 may include at least one memory 822 including computer program code, and at least one processor 821. The at least one memory 822 and the computer program code are configured, with the at least one processor 821, to cause the apparatus 820 at least to allocate, by an access point, in a time division duplex frame a plurality of radio resource slots, each one of the plurality of radio resource slots being allocated for a downlink or an uplink transmission, and determine that the allocation of the downlink or uplink transmission in the should be changed. The at least one memory 822 and the computer program code are configured, with the at least one processor 821, to also cause the apparatus 820 at least to apply a permutation pattern to re-allocate at least one of the plurality of radio resources slots for the downlink or the uplink transmission.

According to certain embodiments, an apparatus 820 may include means for allocating, by an access point, in a time division duplex frame a plurality of radio resource slots, each one of the plurality of radio resource slots being allocated for a downlink or an uplink transmission, and means for determining that the allocation of the downlink or uplink transmission should be changed. The apparatus 820 may also include means for applying a permutation pattern to re-allocate at least one of the plurality of radio resource slots for the downlink or uplink transmission.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as access point 820 or UE 810, to perform any of the processes described above (see, for example, FIGS. 3, 4, 6, and 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 8 illustrates a system including an access point 820 and UE 810, certain embodiments may be applicable to other configurations, and configurations involving additional elements, as illustrated and discussed herein. For example, multiple user equipment devices and multiple access points may be present, or other nodes providing similar functionality, such as nodes that combine the functionality of a user equipment and an access point, such as a relay node. The UE 810 may likewise be provided with a variety of configurations for communication other than communication access point 820. For example, the UE 810 may be configured for device-to-device communication.

The embodiments described above help to provide a distributed method to allocate a pattern of DL/UL slots at APs within the network ensuring low-interference and low-latency operation of the network. In certain embodiments, all APs follow the steps of the deterministic permutation algorithm, resulting in consistent DL/UL slot patterns across the network, and thereby minimizing the DL-into-UL and UL-into-DL slot collisions and interference.

In addition, in certain embodiments, the TDD frame length may be common to all or some APs in the network, and the TDD frames are time synchronized across the APs. This allows the APs to share the permutation algorithm with one another, resulting in a dynamic TDD performance that minimizes interference.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

AP Access Protocol
DL Downlink
UL Uplink
UE User Equipment
TDD Time Division Duplexing
DTDD Dynamic Time Division Duplexing
LTE Long Term Evolution

We claim:

1. A method comprising:
    allocating, by an access point, in a time division duplex frame a plurality of radio resource slots, each one of the plurality of radio resource slots being allocated for a downlink or an uplink transmission;
    determining that the allocation of the downlink or uplink transmission should be changed;
    applying a permutation pattern to re-allocate at least one of the plurality of radio resource slots for the downlink or uplink transmission; and
    flipping the allocation of a number of the plurality of radio resource slots according to a predefined rule applied on the permutation pattern.

2. The method of claim 1, wherein the permutation pattern is set by a deterministic algorithm.

3. The method of claim 1, wherein the permutation pattern provides for low latency slot re-allocation.

4. The method of claim 1, further comprising:
    determining the number of the plurality of radio resource slots of the time division duplex frame that need to be changed from the downlink transmission to the uplink transmission, or from the uplink transmission to the downlink transmission, wherein the flipping of the allocation of the number of the plurality of radio resource slots is based on the determining.

5. The method of claim 4, wherein the predefined rule applied on the permutation pattern is configured to define which of the plurality of radio resource slot indexes of the time division duplex frame are to be flipped.

6. The method of claim 5, wherein the predefined rule specifies that the number of the plurality of radio resource slots of the time division duplex frame that are to be flipped are indicated by the same number of leftmost or rightmost indexes in the permutation pattern.

7. The method of claim 1, wherein the allocating of the plurality of radio resource slots in the time division duplex frame is based on a repetition pattern of downlink and uplink transmission slots.

8. The method of claim 1, further comprising:
    determining a desired split of the plurality of radio resource slots for the downlink and uplink transmission in a cell of the access point;
    allocating, based on the determined split, to the time division duplex frame consecutive sets of the plurality of the radio resource slots, one set being for the downlink transmission and another set for the uplink transmission; and
    re-allocating the radio resource slots in the time division duplex frame according to the permutation pattern, wherein the indexes in the permutation pattern indicate the re-allocated order of the plurality of radio resource slots in the time division duplex frame.

9. The method of claim 1, further comprising:
    receiving a feedback signal from at least one neighboring access point, wherein the feedback signal is used in allocating the plurality of radio resource slots for the downlink transmission and the uplink transmission.

10. The method of claim 1, wherein the permutation pattern is applied consistently to a plurality of access points.

11. The method of claim 1, wherein a length of the time division duplex frame is common to a plurality of access points, and
    wherein the time division duplex frame is time synchronized between the plurality of access points.

12. The method of claim 1, wherein the permutation pattern is determined by an access point autonomously.

13. An apparatus comprising:
    at least one memory comprising computer program code;
    at least one processor;

wherein the at least one memory and the computer program code are configured, with the at least one processor, to cause the apparatus at least to:

allocate, by an access point, in a time division duplex frame a plurality of radio resource slots, each one of the plurality of radio resource slots being allocated for a downlink or an uplink transmission;

determine that the allocation of the downlink or uplink transmission should be changed;

apply a permutation pattern to re-allocate at least one of the plurality of radio resources slots for the downlink or the uplink transmission; and flip the allocation of a number of the plurality of radio resource slots according to a predefined rule applied on the permutation pattern.

14. The apparatus of claim 13, wherein the at least one memory and the computer program code are configured, with the at least one processor, to cause the apparatus at least to:

determine the number of the plurality of radio resource slots of the time division duplex frame that need to be changed from the downlink transmission to the uplink transmission, or from the uplink transmission to the downlink transmission, wherein the flipping of the allocation of the number of the plurality of radio resource slots is based on the determining.

15. The apparatus of claim 13, wherein the predefined rule applied on the permutation pattern is configured to define which of the plurality of radio resource slot indexes of the time division duplex frame are to be flipped.

16. The apparatus of claim 13, wherein the at least one memory and the computer program code are configured, with the at least one processor, to cause the apparatus at least to:

determine a desired split of the plurality of radio resource slots for the downlink and uplink transmission in a cell of the access point;

allocate, based on the determined split, to the time division duplex frame consecutive sets of the plurality of the radio resource slots, one set being for the downlink transmission and another set for the uplink transmission; and re-allocate the radio resource slots in the time division duplex frame according to the permutation pattern, wherein the indexes in the permutation pattern indicate the re-allocated order of the plurality of radio resource slots in the time division duplex frame.

17. The apparatus of claim 13, wherein the at least one memory and the computer program code are configured, with the at least one processor, to cause the apparatus at least to:

receive a feedback signal from at least one neighboring access point, wherein the feedback signal is used in allocating the plurality of radio resource slots for the downlink transmission and the uplink transmission.

18. The apparatus of claim 13, wherein the permutation pattern is applied consistently to a plurality of access points.

19. The apparatus of claim 13, wherein a length of the time division duplex frame is common to a plurality of access points, and wherein the time division duplex frame is time synchronized between the plurality of access points.

20. A non-transitory computer-readable medium encoding instructions that, when executed in hardware, perform a process, the process comprising:

allocating, by an access point, in a time division duplex frame a plurality of radio resource slots, each one of the plurality of radio resource slots being allocated for a downlink or an uplink transmission;

determining that the allocation of the downlink or uplink transmission should be changed;

applying a permutation pattern to re-allocate at least one of the plurality of radio resources slots for the downlink or the uplink transmission; and flipping the allocation of a number of the plurality of radio resource slots according to a predefined rule applied on the permutation pattern.

* * * * *